United States Patent
Gleichman et al.

(10) Patent No.: US 8,837,792 B2
(45) Date of Patent: Sep. 16, 2014

(54) ULTRASOUND IMAGE PROCESSING

(75) Inventors: Sivan Gleichman, Haifa (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 13/151,303

(22) Filed: Jun. 2, 2011

(65) Prior Publication Data
US 2012/0308103 A1    Dec. 6, 2012

(51) Int. Cl.
    *G06K 9/00*    (2006.01)
(52) U.S. Cl.
    USPC .......................................................... 382/128
(58) Field of Classification Search
    USPC ................................. 382/128–134
    See application file for complete search history.

(56) References Cited

U.S. PATENT DOCUMENTS

| 2006/0241431 | A1 | 10/2006 | Kamiyama |
| 2008/0031506 | A1* | 2/2008 | Agatheeswaran et al. .... 382/132 |
| 2012/0128223 | A1* | 5/2012 | Rivaz et al. .................. 382/131 |

FOREIGN PATENT DOCUMENTS

EP           882426        3/2003

OTHER PUBLICATIONS

E. Walach er al., "Local tissue attenuation images based on pulsed-echo ultrasound scans" IEEE Trans. on Bio. Eng., vol. 36, No. 2, Feb. 1989.
E. Walach et al., "Quantitative tissue characterization based on pulsed-echo ultrasound scans" IEEE Trans. on Bio. Eng. vol. 33, No. 7, Jul. 1986.
Sheng-Wen Huang and Pai-Chi Li,, "Ultrasonic Computed Tomography Reconstruction of the Attenuation Coefficient Using a Linear Array", Ultrasonic Computed Tomography Reconstruction of the Attenuation Coefficient Using a Linear Array.
Chen-Han Chang et al., "Attenuation Measurements for Ultrasonic Breast Imaging: Comparisons of Three Approaches", 2008 IEEE.

* cited by examiner

*Primary Examiner* — Alex Liew (57) ABSTRACT

Method, system, and computer program product are provided for processing an ultrasound image, in particular an image of inhomogeneous tissue. The method includes: segmenting tissue in a received ultrasound image; creating a mask of pixels centred on a pixel in a tissue area, wherein the pixels in the mask are within a given decibel range of the central pixel and within a segmentation boundary; and assigning an attenuation to the central pixel by estimating the attenuation of the pixels in the mask. The received ultrasound image may be a raw image the method may include creating an image of an attenuation mapping of attenuations for each pixel in a tissue area. Alternatively, the received ultrasound image may be a time gain compensated image the method may include determining areas of relatively high or low attenuation.

18 Claims, 5 Drawing Sheets

ULTRASOUND IMAGE PROCESSING

BACKGROUND

This invention relates to the field of ultrasound image processing. In particular, the invention relates to ultrasound image processing for inhomogeneous tissue.

The background and description use the context of breast tissue diagnosis. However, the described method and system may also be applied to other forms of tissue, in particular inhomogeneous types of tissue.

Usually, detection and diagnosis of breast cancer is done using x-ray mammography. There are three main problems with this test: it exposes the patient to ionizing radiation; it is less effective in women with dense breast (usually young women); and it cannot be used during an operation, such as biopsy or surgery. On the other hand, B-scan breast ultrasound is harmless, effective in dense breasts, and can easily be used during operations. However, micro-calcifications, which are found to be a significant indicator for breast cancer, are rarely visible in ultrasound images. Moreover, the interpretation of ultrasound images, and especially in the context of identifying micro-calcifications, is strongly dependent on the inspecting doctor.

By mapping the acoustic attenuation from a breast ultrasound image, one can gain a more quantitative marker, which can help in finding breast masses and micro-calcifications, with less dependency on the inspecting doctor. The same approach can be used in characterization of the breast tumours (in particular differentiation between cancerous and benign cases).

Attenuation in ultrasound is the reduction in amplitude of the ultrasound beam as a function of distance through the imaging medium. Accounting for attenuation effects in ultrasound is important because a reduced signal amplitude can affect the quality of the image produced. By knowing the attenuation that an ultrasound beam experiences traveling through a medium, one can adjust the input signal amplitude to compensate for any loss of energy at the desired imaging depth.

BRIEF SUMMARY

According to a first aspect of the present invention there is provided a computer-implemented method for processing an ultrasound image performed by a computerized device, comprising: segmenting tissue in a received ultrasound image; creating a mask of pixels centred on a pixel in a tissue area, wherein the pixels in the mask are within a given decibel range of the central pixel and within a segmentation boundary; and assigning an attenuation to the central pixel by estimating the attenuation of the pixels in the mask.

According to a second aspect of the present invention there is provided a computer program product for processing an ultrasound image, the computer program product comprising: a computer readable non-transitory storage medium having computer readable program code embodied therewith, the computer readable program code comprising: computer readable program code configured to: segment tissue in a received ultrasound image; create a mask of pixels centred on a pixel in a tissue area, wherein the pixels in the mask are within a given decibel range of the central pixel and within a segmentation boundary; and assign an attenuation to the central pixel by estimating the attenuation of the pixels in the mask.

According to a third aspect of the present invention there is provided a system for ultrasound image processing, comprising: a processor; an ultrasound data receiver; a segmentation component for segmentation of tissue in a received ultrasound image; a masking component for creating a mask of pixels centred on a pixel in a tissue area, wherein the pixels in the mask are within a given decibel range of the central pixel and within a segmentation boundary; and an attenuation estimating component for assigning an attenuation to the central pixel by estimating the attenuation of the pixels in the mask.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The described ultrasound image processing allows an attenuation method in imaging applications for inhomogeneous tissue, for example, breast tissue. The described ultrasound image processing, firstly, applies an attenuation imaging method to inhomogeneous tissues, and, secondly, enables implementation for processed (not raw) ultrasound images allowing the approach to work both for processed as well as raw images.

In order to estimate tissue attenuation, one has to identify uniform homogenous tissue blocks in the vicinity of each pixel. Then average attenuation for the entire block is computed and assigned to the center pixel. In the state of the art approach, such uniform blocks are identified by finding long runs of pixels having values relatively similar to that of the center pixel. This approach works well for homogenous organs (such as liver) where long homogenous runs can be easily found. However, in inhomogeneous tissue, typical in-range runs are quite short. As a result, reliable attenuation estimate becomes impossible.

In order to mitigate this problem, an estimation method is described that works for blocks containing both in-range and out of range pixels. This approach is further augmented by the combination of local and global segmentation methods.

Implementing the described algorithm on raw ultrasound data will provide a mapping of the real tissue attenuation value. This approach provides quantitative data (as opposed to qualitative images provided by the standard ultrasonic hardware). Unfortunately, in state of the art systems, raw data is, usually, unavailable. Indeed, system providers strive to create homogenous displays. Accordingly they tend to amplify weak signals coming from tissues deep within the body. This is done by application of so called TGC (Time Gain Compensation) curve that amplifies late signals (coming from a greater depth). Typically, image processing is done at a display workstation connected to the hospital PACS (Picture Archiving and Communication Systems), where TGC value is unknown. Hence quantitative attenuation estimate is infeasible. However, as described below, a relative attenuation of each pixel in respect to its surroundings can be calculated. As a result, diagnostic value of attenuation images is preserved.

Figure 1:
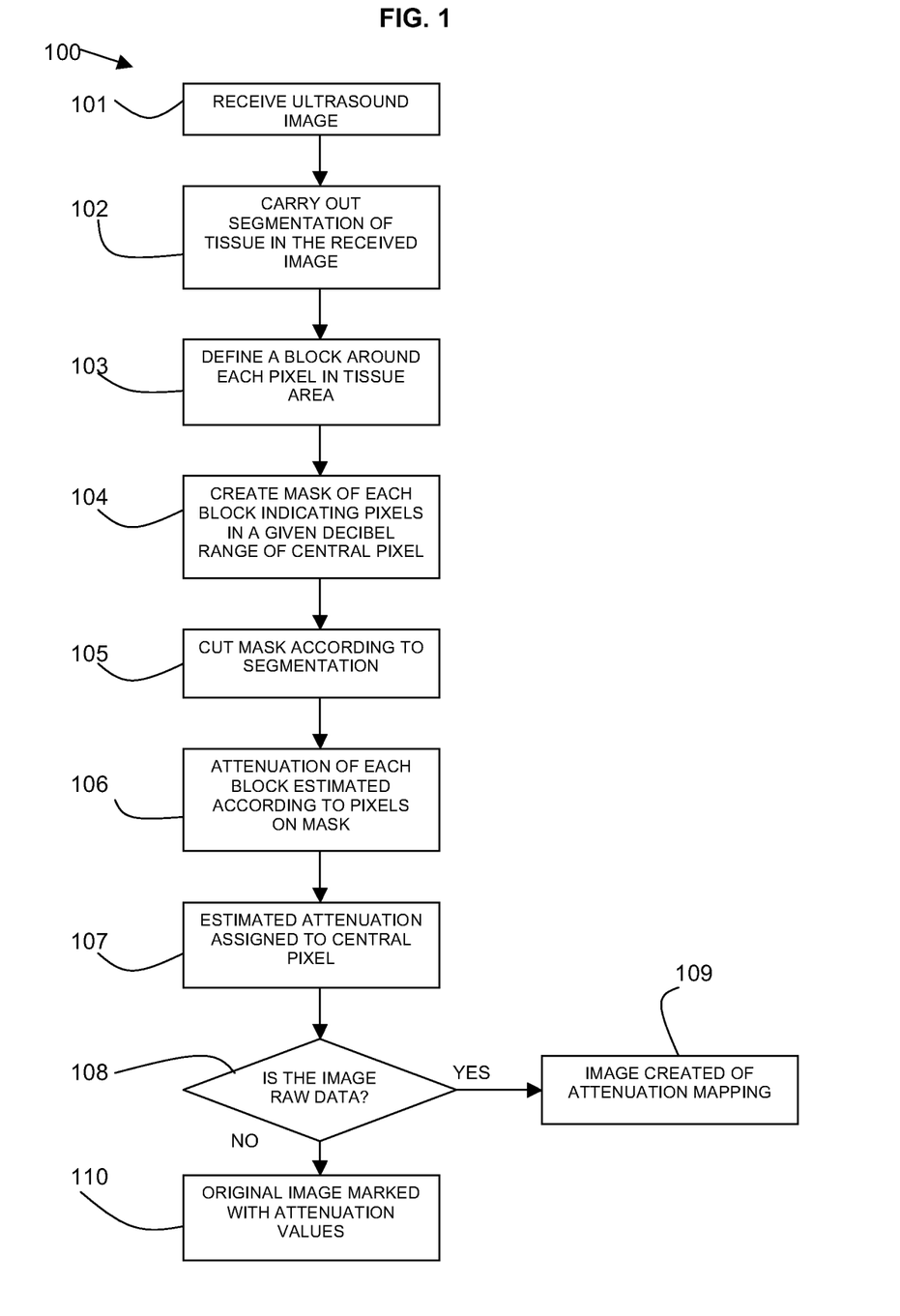
FIG. 1 is a flow diagram of a method in accordance with the present invention.

Referring to FIG. 1, a flow diagram 100 shows an embodiment of the described ultrasound image processing.

An ultrasound image is received 101 and segmentation may be carried out 102 of the tissue of interest in the full ultrasound image. For example, the ultrasound image may be of breast tissue and segmentation disregards the fat tissue from above and the chest from below. Alternatively, the ultrasound image may be of liver, prostate or other tissues.

A block is defined 103 around each pixel in the tissue area. A mask is created 104 of each block which indicates the pixels which are within a given decibel range from the central pixel, one embodiment of this step is described in FIG. 4 below. The mask may then be cut 105 according to the macro-segments identified in the step 102.

The attenuation of each block may be estimated 106 according to the pixels on the mask alone, and this value may be assigned 107 to the central pixel.

It is determined 108 if the data is raw data. If the data is raw data, an image may be created 109 of the attenuation mapping and suspicious areas may be identified.

If the data is not raw data and the image has time gain compensation (TGC) only pixels with high or low attenuation values may be marked 110. That is, all pixels with attenuation around zero may be discarded. This way suspicious areas in the tissue can be found.

Figure 2:
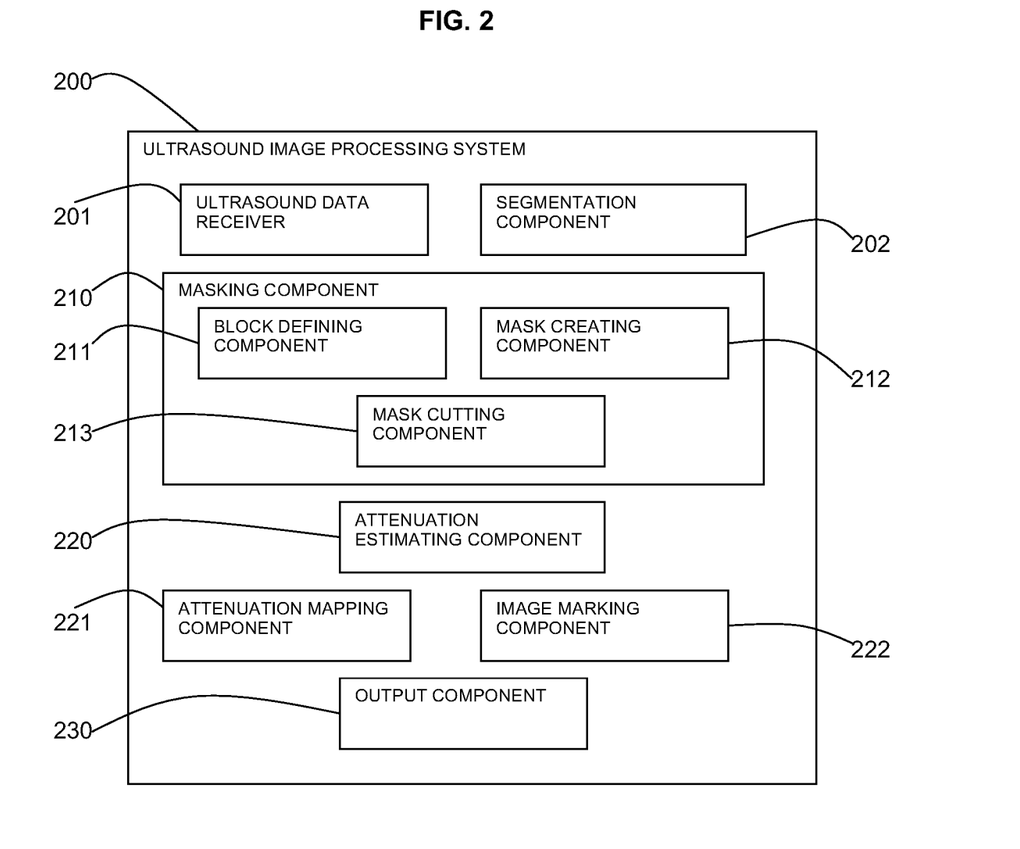
FIG. 2 is a block diagram of a system in accordance with the present invention.

Referring to FIG. 2, a block diagram shows an ultrasound image processing system 200. The image processing system 200 includes an ultrasound data receiver 201 which may receive raw image data or images with time gain compensation. The image processing system 200 may include a segmentation component 202 for segmentation of tissue of interest in a full ultrasound image.

The image processing system 200 may also include a masking component 210. The masking component 210 may include a block defining component 211 for defining a block around each pixel in the tissue area. The masking component 210 may include a mask creating component 212 for creating a mask of each block of pixels within a given decibel range of the central pixel. The masking component 210 may further include a mask cutting component 213 for cutting the mask according to the macro-segments identified in the segmentation component 202.

The image processing system 200 may include an attenuation estimating component 220 for estimating the attenuation of each block according to the pixels on the mask and assigning this value to the central pixel.

The image processing system 200 may include an attenuation mapping component 221 for creating an image of the attenuated mapping for output and analysis. The attenuation mapping component 221 may be used when raw data is received at the image processing system 200.

The image processing system 200 may include an image marking component 222 for marking a received image with attenuations. The image marking component 222 may be used when the received image is a time gain compensated image.

The image processing system may include an output component 230 for outputting attenuated mapping images or images with attenuation marking for analysis.

Figure 3:
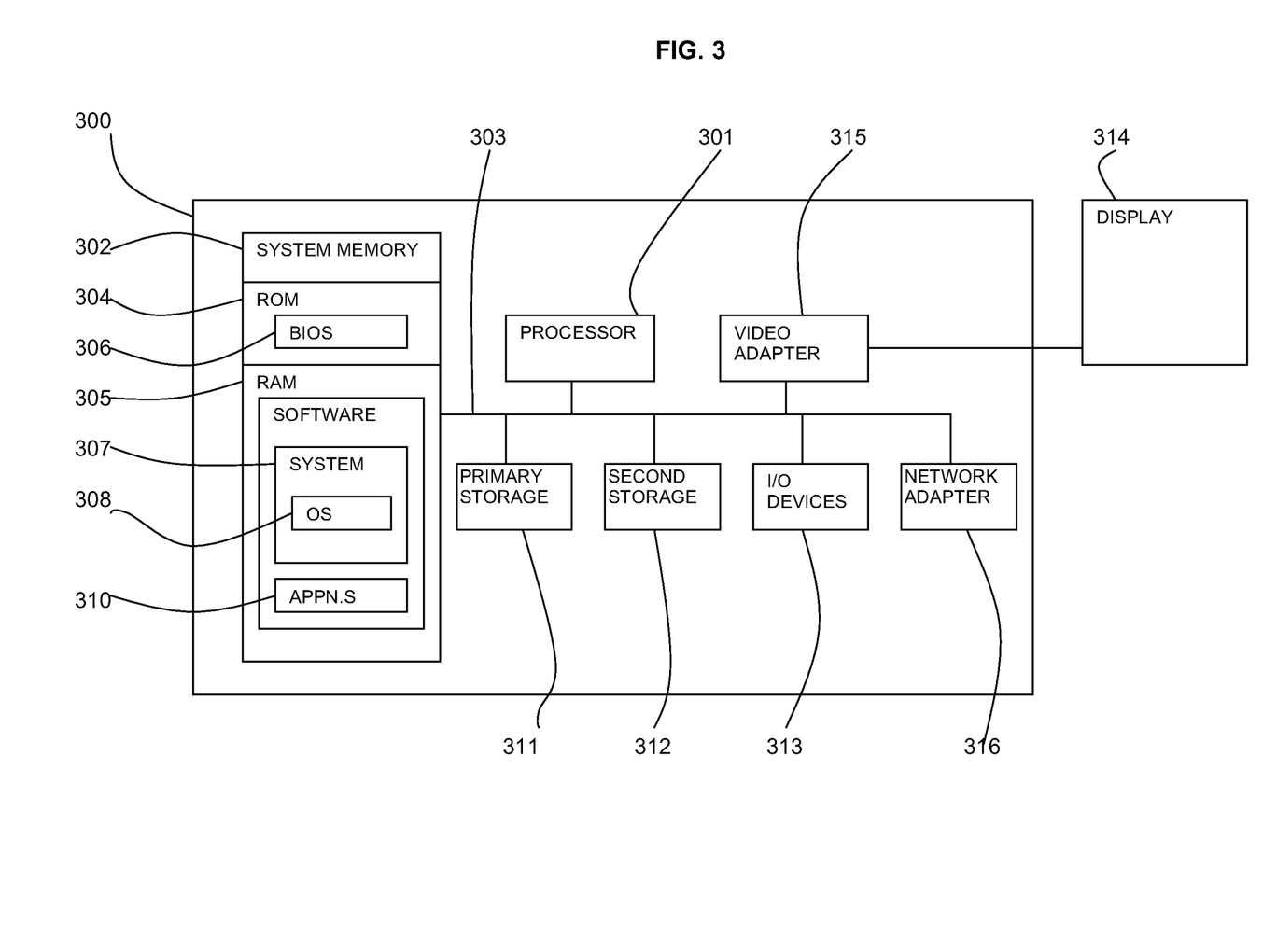
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Further details are now provided of the method shown in the flow diagram of FIG. 1.

In one embodiment, the step of segmenting tissue in an image (step 102 in FIG. 1) is done using the active contour method designed to identify relatively uniform parts of the image. For example, in a typical breast image, an area of interest would manifest itself as a bright horizontally stripy area.

The step of defining a block around each pixel of the image (step 103 of FIG. 1) may choose a surrounding rectangular block with the chosen pixel at the centre. The block may have a width in the range of 9 to 25 pixels and a height in the range of 25 to 125 pixels, for example, in one embodiment a block may have size 17×65 pixels.

Figure 4:
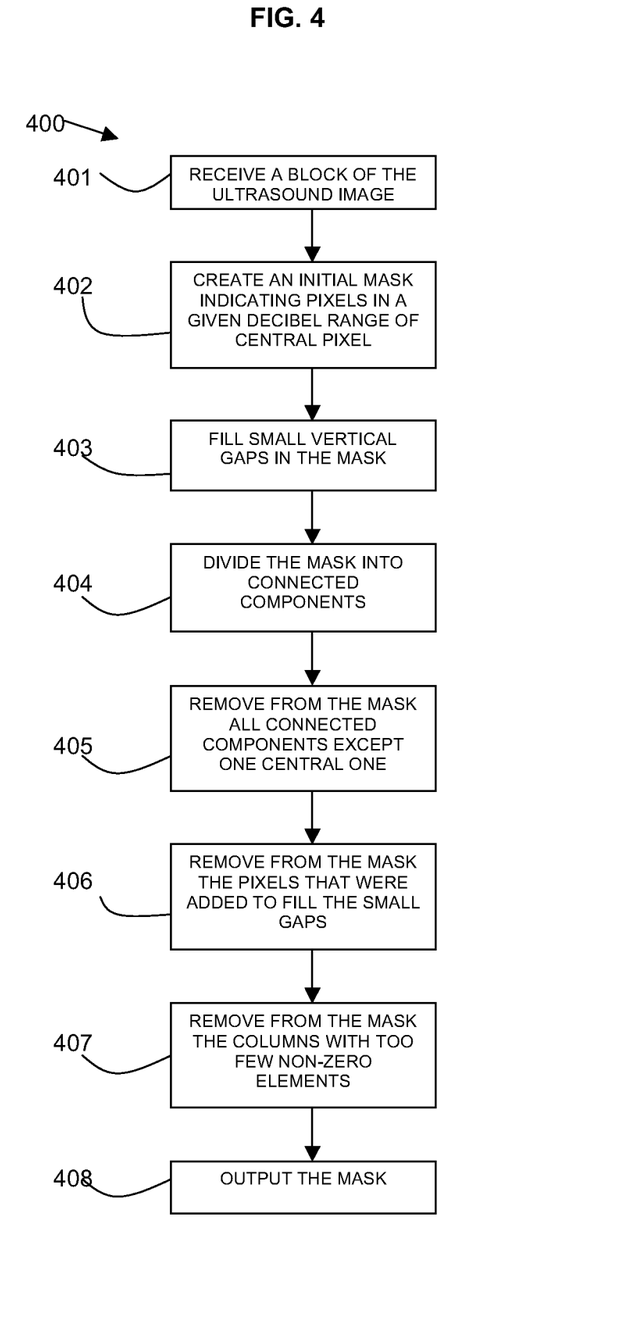
FIG. 4 is a flow diagram of an aspect of a method in accordance with the present invention.

Referring to FIG. 4, a flow diagram 400 shows an embodiment of the mask creating step 104 of FIG. 1. A block of the ultrasound image is received 201 around a central pixel. An initial mask is created 402 indicating pixels in a given decibel range of the central pixel, for example, within a range of 2 to 6 dB from the central pixel. In one embodiment, a mask may be created of pixels within 3 dB of the central pixel. Small vertical gaps may be filled 403 in the mask.

Next, the mask may be divided 404 into connected components. All connected components may be removed 405 except the central one. The pixels that were added in step 403 to fill gaps may be removed 406 from the mask. It is also possible to remove 407 from the mask columns with too few non-zero elements. The mask is then output 408.

Alternatively, instead of keeping only the central connected component, for each connected component, the attenuation is estimated separately, and the final attenuation value is the average over all connected components.

The following code is an example for Matlab (matrix laboratory) (MATLAB is a trade mark of MathWorks, Inc.) numerical computing environment for the mask creating step:

```
function mask=CreatMask(E,x,y)
h=size(E,1);
pc=E(y,x); central pixel
mask=(E<(1.3*pc))&(E>(0.7*pc)); pixels in range
mask1=mask;
filling holes
[labels,num]=bwlabel(~mask); division to connected components
for L=1:num look over all connected components
    Lmask=(labels==L); the current connected component
    row=find(sum(Lmask,2)); the row indexes of connected component
    if (min(row)>1)&&(max(row)<h)&&(sum(sum(Lmask)>4)<3)
        mask=mask+Lmask;
    end
end
mask=bwselect(mask,x,y); leaving only the central CC on the mask
mask=mask.*mask1;
```

In step 105 of FIG. 1, parts of the mask are removed that cross boundaries of macro-segments identified in the segmentation step 102 of FIG. 1.

For the step of estimating the attenuation of each block (step 106 of FIG. 1), a simple exponential model for backscatter echo amplitude is assumed. The estimation of the attenuation is done using a variation of the extended Prony method, under the assumption that the attenuation in all the pixels on the mask is uniform. Prony's method extracts valuable information from a uniformly sampled signal and builds a series of damped complex exponentials or sinusoids.

Denote the block width and height by P and k respectively. Also denote the ith column of the mask by $\Omega_i$ and the number of non-zero elements in $\Omega_i$ by $k_i$. In the step of cutting the mask, the following cost function is minimized:

$$C = \sum_{i=1}^{P} \sum_{j \in \Omega_i} \left(E_{i,j} - \hat{E}_i e^{-2(j-1)\alpha}\right)^2$$

where $E_{i,j}$ is the echo amplitude (which is the intensity of the i,jth pixel in the ultrasound image); $\hat{E}_i$ is the amplitude in the top of the ith column of the block; and $\alpha$ is the attenuation of the block.

Setting to zero the derivative relative to $\hat{E}_i$ yields:

$$\hat{E}_i \approx \frac{\sum_{j \in \Omega_i} E_{i,j} e^{-2(j-1)\alpha}}{\sum_{j \in \Omega_i} e^{-4(j-1)\alpha}}.$$

Using the Taylor series expansion of the exponential yields: $\hat{E}_i = a_i - 2b_i\alpha$, where:

$$a_i = \frac{\sum_{j \in \Omega_i} E_{ij}}{k_i},$$

$$b_i = \frac{\sum_{j \in \Omega_i} (j-1) E_{ij}}{k_i} - A_i a_i, \text{ and}$$

$$A_i = \frac{2}{k_i} \sum_{j \in \Omega_i} (j-1).$$

Substitution into the cost function C and setting to zero the derivative relative to $\alpha$ implies:

$$\alpha = \frac{\sum_{i=1}^{P} D_i^T B_i}{\sum_{i=1}^{P} B_i^T B_i},$$

where:

$$D_i = (a_i - E_{i,1}, \ldots, a_i - E_{i,k})^T,$$

$$B_i = 2 \cdot \text{diag}(\Omega i) \cdot (b_i, b_i + a_i, \ldots, b_i + (k_i - 1)a_i)^T.$$

In an alternative embodiment, each column in the mask is separated into sequential non-zero segments (while ignoring small holes), and the aforementioned calculation of the attenuation ($\alpha$) is performed by summation on all the separate segments from all the columns (P is increased). In this case, it is not assumed that the attenuation is uniform along the mask, but instead it is assumed that it is piecewise constant, i.e., it is uniform on the sequential non-zero segments.

The following is an example of Matlab implementation of the attenuation calculation:

```
loading the image
im_name='U5cropped.tif';
im=imread(im_name);
if size(size(im),2)==3
    im=rgb2gray(im);
end
dim_im=size(im);
figure(1)
imshow(im,[ ])
im=double(im);
im=im/max(im(:));
box parameters
w=17;
h=65;
w2=floor(w/2);
h2=floor(h/2);
attenuation calculation
alpha_map=zeros(size(im));
wb=waitbar(0,['Processing image: ',im_name,'...']); creating the
progress bar
for x=1:dim_im(2)
    left=max(1,x-w2);
    right=min(size(im,2),x+w2);
    for y=1:dim_im(1)
        top=max(1,y-h2);
        bottom=min(size(im,1),y+h2);
        E=double(im(top:bottom,left:right));
        dim=size(E);
        mask=CreatMask(E,x-left+1,y-top+1);
        if max(sum(mask))<=10
            continue;
        end
        E=E.*mask;
        k=sum(mask);
        E(:,k<4)=[ ];
        mask(:,k<4)=[ ];
        k(k<4)=[ ];
        dim=size(E);
        a=sum(E)./k;
        A=repmat(a,dim(1),1);
        D=A-E;
        j=(0:(dim(1)-1))';
        J=repmat(j,1,dim(2));
        s=2*sum(J.*mask)./k;
        b=sum(J.*E)./k-s.*a;
        B_mat=repmat(b,dim(1),1);
        B=2*(B_mat+J.*A).*mask;
        alpha_map(y,x)=trace(D'*B)/trace(B'*B);
    end
    waitbar(x / dim_im(2)) updating progress bar
end
close(wb) closing the progress bar
```

Attenuation may be estimated using other alternative methods. For instance, Maximum likelihood method can be used instead of the Prony method. However, the above implementation has advantages because it does not rely on any underlying assumptions about the statistical data distribution.

When dealing with raw data, after estimating the attenuation, an image may be created of the attenuation mapping and the suspicious areas may be found (for example, breast cysts, tumor masses or calcifications). However, when dealing with images with TGC, the attenuation mapping after the attenuation estimating is almost entirely zero. Therefore, instead of plotting this mapping, the original image is marked in only the areas with relatively high or low attenuation.

Figure 5A:
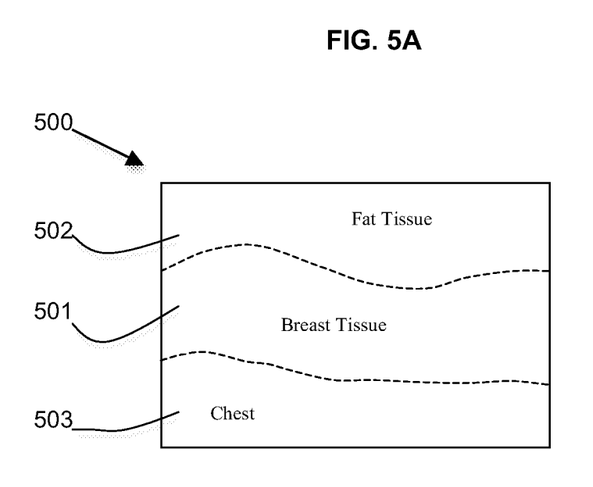
FIGS. 5A and 5B are diagrams showing imaging results in accordance with the present invention.
Figure 5B:
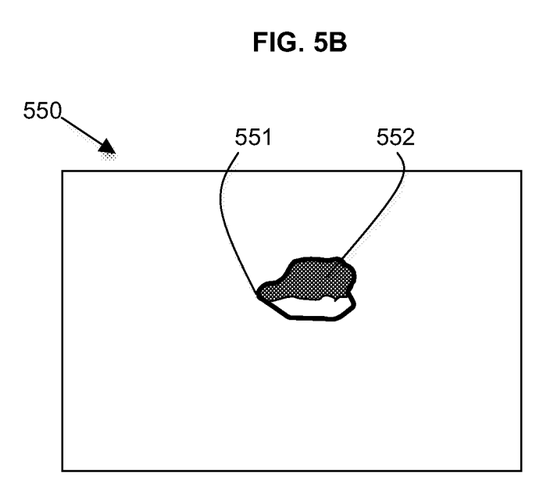

Referring to FIGS. 5A and 5B, example images are shown. In FIG. 5A, the segmentation of tissue of interest is illustrated 500. In this example, breast tissue 501 is segmented from fat tissue 502 above and the chest area 503 below.

In FIG. 5B, an example image 550 showing marked attenuation is shown. In this image 550 a tumor 551 is shown with an area of high attenuation 552 marked on the image 550.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for processing an ultrasound image performed by a computerized device, the method comprising:
    segmenting tissue in a received ultrasound image, the ultrasound image comprising a plurality of pixels representing a tissue area;
    creating a mask of pixels around a central pixel in the tissue area, wherein the pixels in the mask are within a given decibel range of the central pixel and within a segmentation boundary; and
    assigning an attenuation to the central pixel by estimating the attenuation of the pixels in the mask, assuming that attenuation of the pixels in the mask is either uniform along the mask or constant across sequential segments along the mask.

2. The method as claimed in claim 1, wherein a received ultrasound image is a raw image, the method further comprising:
    creating an image of an attenuation mapping of attenuations for each pixel in a tissue area.

3. The method as claimed in claim 1, wherein a received ultrasound image is a time gain compensated image, the method further comprising:
    determining areas of relatively high or low attenuation.

4. The method as claimed in claim 3, further comprising:
    marking the received ultrasound image with attenuation information.

5. The method as claimed in claim 1, wherein creating a mask is carried out for each pixel in a tissue area.

6. The method as claimed in claim 1, further comprising:
    defining a block of pixels around a central pixel and creating a mask of pixels within the defined block.

7. The method as claimed in claim 1, wherein creating a mask of pixels comprises:
    dividing the mask into connected components and selecting a central area of connected components.

8. The method as claimed in claim 1, wherein estimating the attenuation of the pixels in the mask assumes that the attenuation in all the pixels on the mask is uniform.

9. The method as claimed in claim 1, wherein estimating the attenuation of the pixels in the mask assumes the attenuation is piecewise constant on sequential non-zero segments.

10. The method as claimed in claim 1, wherein estimating the attenuation of the pixels in the mask uses an extended Prony method.

11. A computer program product comprising a non-transitory data storage medium with logic code embedded thereon, wherein executing the logic code on a computer causes the computer to:
    segment tissue in a received ultrasound image, the ultrasound image comprising a plurality of pixels representing a tissue area;
    create a mask of pixels around a central pixel in the tissue area, wherein the pixels in the mask are within a given decibel range of the central pixel and within a segmentation boundary; and
    assign an attenuation to the central pixel by estimating the attenuation of the pixels in the mask, assuming that attenuation of the pixels in the mask is either uniform along the mask or constant across sequential segments along the mask.

12. A system for ultrasound image processing, the system comprising:
    a processor;
    an ultrasound data receiver;
    a segmentation component for segmentation of tissue in a received ultrasound image, the ultrasound image comprising a plurality of pixels representing a tissue area;
    a masking component for creating a mask of pixels around a central pixel in the tissue area, wherein the pixels in the mask are within a given decibel range of the central pixel and within a segmentation boundary; and
    an attenuation estimating component for assigning an attenuation to the central pixel by estimating the attenuation of the pixels in the mask, assuming that attenuation of the pixels in the mask is either uniform along the mask or constant across sequential segments along the mask.

13. The system as claimed in claim 12, wherein a received ultrasound image is a raw image, the system further comprising:
an attenuation mapping component for creating an image of an attenuation mapping of attenuations for each pixel in a tissue area.

14. The system as claimed in claim 12, wherein a received ultrasound image is a time gain compensated image, the system further comprising:
an image marking component for determining areas of relatively high or low attenuation and marking the received ultrasound image with attenuation information.

15. The system as claimed in claim 12, wherein the masking component comprises:
a block defining component for defining a block of pixels around a central pixel and creating a mask of pixels within the defined block.

16. The system as claimed in claim 12, wherein the masking component comprises:
a mask creating component for creating a mask of pixels wherein the pixels in the mask are within a given decibel range.

17. The system as claimed in claim 16, wherein the mask creating component is configured for dividing the mask into connected components and selecting a central area of connected components.

18. The system as claimed in claim 12, wherein the masking component comprises:
a mask cutting component for cutting a mask according to the segmentation of the tissue.

* * * * *